UNITED STATES PATENT OFFICE.

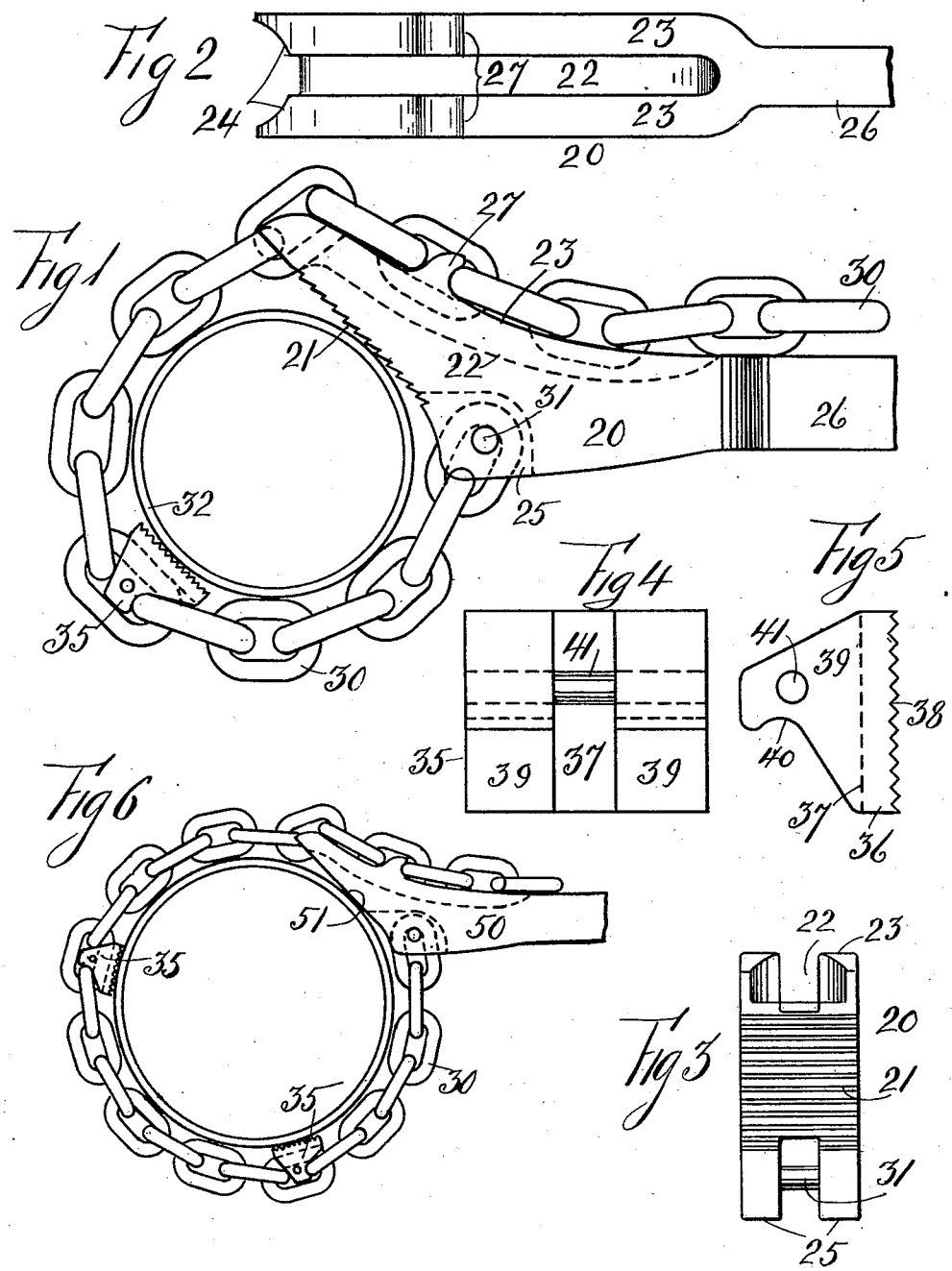

PHILIP FARRELL, OF FLUSHING, NEW YORK.

CHAIN TONGS.

968,335.  Specification of Letters Patent.  Patented Aug. 23, 1910.

Application filed October 1, 1908. Serial No. 455,738.

*To all whom it may concern:*

Be it known that I, PHILIP FARRELL, a citizen of the United States, and resident of Flushing, in the county of Queens and State of New York, have invented certain new and useful Improvements in Chain Tongs, of which the following is a specification.

This invention relates to chain tongs, and its object is the production of tongs that comprise a jaw, a shoe and a chain coacting to adapt the tongs for many different sizes of pipes and the like.

In the drawings, Figure 1 represents a partial side view of a chain tongs exemplifying the invention, Fig. 2 is a partial top plan view of Fig. 1 with the chain and pipe removed, Fig. 3 is a left hand end view of Fig. 2, Fig. 4 represents an enlarged top plan view of a shoe, Fig. 5 is a left hand view of Fig. 4 and Fig. 6 shows a modified side view of the invention.

The tongs are represented with the jaw 20, having the gripping teeth 21 at the lower portion thereof. A channel 22 is formed in the roof 23 of the jaw and which is widened at the forward end as shown at 24. Ears 25 are formed in the lower portion of the jaw below the teeth 21. A handle 26 extends from said jaw and from the roof 23 thereof extend the engaging lugs 27. One end of the chain 30 is engaged by the pin 31 secured in the ears 25, the said chain when the tongs are in use is wrapped around a pipe 32, with one of the links of the chain hooked under the lugs 27. A shoe 35 is pinned to one of the links of the chain 30 and preferably diametrically opposite the gripping teeth 21. The shoe 35 comprises the main portion 36 with the crown 37 and the teeth 38 in the lower face thereof. Jaws 39 extend from the main portion 36, and have formed in their upper edges the reëntering bearing surfaces 40. The jaws are connected by the pin 41, with which latter the said shoe is pinned to the chain 30. When using the tongs the link of the chain that is connected with the shoe 35 bears on the crown 37 of the main portion 36 thereof. A second link engages the reëntering bearing surfaces 40 and also bears on the adjacent edges of the jaws of the shoe. By virtue of this disposition of the elements the pin 41 is not subjected to any strain.

In the modified form of the invention represented in Fig. 6 a jaw 50 is shown similar to 20, but its bearing face 51 is devoid of any gripping teeth, and the chain 30 has preferably connected therewith a pair of the said shoes 35.

Having described my invention I claim:

1. In a chain tongs the combination of a jaw, gripping teeth on the jaw, one end of a linked chain pinned to the jaw below said gripping teeth, a shoe pinned to a link of the chain, jaws extending from the shoe with reëntering bearing surfaces, a crown in said shoe and said link bearing thereon, a second link engaging the reëntering bearing surfaces and also bearing on the jaws of said shoe, and teeth extending from the lower face of the shoe.

2. In a chain tongs the combination of a jaw to bear on a pipe, a chain extending from the lower portion of the jaw and adapted to be wrapped about said pipe, lugs extending from the roof of the jaw to engage said chain, a pair of shoes pinned to the chain, jaws extending from each shoe and having reëntering bearing surfaces formed therewith a crown for each shoe, a link of the chain bearing on the crown of one shoe and a second link bearing on the crown of the other shoe, a third link adjacent to the link of each shoe in engagement with the reëntering bearing surfaces thereof and bearing on the jaws of the same.

Signed at the borough of Manhattan in the county of New York and State of New York this 29th day of September A. D. 1908.

PHILIP FARRELL.

Witnesses:
ARTHUR MARION,
MARTIN ZIMANSKY.